(12) United States Patent
Yadav et al.

(10) Patent No.: US 11,276,877 B2
(45) Date of Patent: Mar. 15, 2022

(54) STABILIZED BIRNESSITE CATHODE FOR HIGH POWER AND HIGH ENERGY DENSITY APPLICATIONS

(71) Applicant: RESEARCH FOUNDATION OF THE CITY UNIVERSITY OF NEW YORK, New York, NY (US)

(72) Inventors: Gautam G. Yadav, New York, NY (US); Michael Nyce, New York, NY (US); Jinchao Huang, New York, NY (US); Alexander Couzis, New York, NY (US); Sanjoy Banerjee, New York, NY (US)

(73) Assignee: RESEARCH FOUNDATION OF THE CITY UNIVERSITY OF NEW YORK, New York City, NY (US)

( * ) Notice: Subject to any disclaimer, the term of this patent is extended or adjusted under 35 U.S.C. 154(b) by 251 days.

(21) Appl. No.: 16/493,966

(22) PCT Filed: May 4, 2018

(86) PCT No.: PCT/US2018/031124
§ 371 (c)(1),
(2) Date: Sep. 13, 2019

(87) PCT Pub. No.: WO2018/176063
PCT Pub. Date: Sep. 27, 2018

(65) Prior Publication Data
US 2020/0083559 A1 Mar. 12, 2020

Related U.S. Application Data

(60) Provisional application No. 62/471,436, filed on Mar. 15, 2017.

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0471* (2013.01); *H01M 4/131* (2013.01);
(Continued)

(58) Field of Classification Search
CPC .......... H01M 10/052; H01M 10/0525; H01M 10/054; H01M 10/128; H01M 2004/021;
(Continued)

(56) References Cited

U.S. PATENT DOCUMENTS 5,156,934 A 10/1992 Kainthia et al.

FOREIGN PATENT DOCUMENTS

CN 105355462 A 2/2016
KR 101602416 B1 3/2016
(Continued)

OTHER PUBLICATIONS

International Preliminary Report on Patentability dated Sep. 26, 2019, for International Application No. PCT/US2018/031124, filed on May 4, 2018.
(Continued)

*Primary Examiner* — Carlos Barcena
(74) *Attorney, Agent, or Firm* — Andrew Metrailer; Conley Rose, P.C.

(57) ABSTRACT

A battery comprises a housing, an electrolyte disposed in the housing, an anode disposed in the housing, a stabilized cathode disposed in the housing and comprising a cathode material. The cathode material comprises a composition selected from birnessite or layered-polymorph of manganese dioxide ($\delta$-$MnO_2$), the composition being stabilized by bismuth and copper ions, a conductive carbon, and a binder. The anode can be at least 50% (m/m) lithium, magnesium, aluminum, or zinc.

31 Claims, 6 Drawing Sheets

(51) Int. Cl.
  *H01M 4/131* (2010.01)
  *H01M 4/1391* (2010.01)
  *H01M 4/505* (2010.01)
  *H01M 4/525* (2010.01)
  *H01M 4/62* (2006.01)
  *H01M 4/66* (2006.01)
  *H01M 4/02* (2006.01)

(52) U.S. Cl.
  CPC ......... *H01M 4/1391* (2013.01); *H01M 4/505* (2013.01); *H01M 4/525* (2013.01); *H01M 4/623* (2013.01); *H01M 4/625* (2013.01); *H01M 4/661* (2013.01); *H01M 2004/021* (2013.01)

(58) Field of Classification Search
  CPC .. H01M 4/0471; H01M 4/131; H01M 4/1391; H01M 4/505; H01M 4/525; H01M 4/622; H01M 4/623; H01M 4/625; H01M 4/661
  See application file for complete search history.

(56) References Cited

FOREIGN PATENT DOCUMENTS

| | | |
|---|---|---|
| WO | 2016061030 A1 | 4/2016 |
| WO | 2018176063 A2 | 9/2018 |

OTHER PUBLICATIONS

International Search Report and Written Opinion dated Feb. 25, 2019, for International Application No. PCT/US2018/031124, filed on May 4, 2018.

Yadav, Gautam G. et al., "Regenerable Cu-intercalated Mn02 layered cathode for highly cyclable energy dense batteries", Nature Communications, 2017 (Published date: Mar. 6, 2017), vol. 8, Article No. 14424.

STABILIZED BIRNESSITE CATHODE FOR HIGH POWER AND HIGH ENERGY DENSITY APPLICATIONS

CROSS-REFERENCE TO RELATED APPLICATIONS

This application is a filing under 35 U.S.C. 371 as the National Stage of International Application No. PCT/US2018/031124, filed on May 5, 2018, entitled, "A STABILIZED BIRNESSITE CATHODE FOR HIGH POWER AND HIGH ENERGY DENSITY APPLICATIONS," and which claims the benefit of and claims priority to U.S. Provisional Application No. 62/471,436 filed Mar. 15, 2017 and entitled "Stabilized Birnessite Cathode for High Power and High Energy Density Applications," both of which are incorporated herein by reference in their entirety for all purposes.

STATEMENT OF FEDERALLY SPONSORED RESEARCH OR DEVELOPMENT

This invention was made with Government support under grant number DEAR0000150 awarded by the U.S. Department of Energy. The government has certain rights in the invention.

BACKGROUND

Lithium (Li)-ion batteries are nowadays ubiquitous and used for a number of applications because of its high specific and volumetric energy and power densities. Lithium-ion batteries burst onto the scene in the early 1990s when they first appeared in hand-held video cameras. Since then they've been used to power everything from jets' electrical systems to cars to the smartphones carried by billions. The batteries are attractive to device makers because they can store relatively large amounts of energy in a small space. Lithium-ion batteries are no more inherently dangerous than any other battery, but they are more energy dense. And the more energy stored, the potentially more dangerous a battery becomes. Li-ion batteries have caused fires and mass recalls. The primary cause for this instability is the thermal runaway reactions inside the battery due to the use of cobalt in the cathode materials of the battery. Cobalt is also the source of the high price of the battery. To improve the safety and the economics of the battery, manganese is a better transition metal source.

SUMMARY

In an embodiment, a battery comprises a housing, an electrolyte disposed in the housing, an anode disposed in the housing, a stabilized cathode disposed in the housing and comprising a cathode material. The cathode material comprises a composition selected from birnessite or layered-polymorph of manganese dioxide ($\delta$-$MnO_2$), the composition being stabilized by bismuth and copper ions, a conductive carbon, and a binder. The anode can be at least 50% (m/m) lithium, magnesium, aluminum, or zinc.

In an embodiment, a method of operating a battery comprises discharging a battery, and charging the battery. The battery comprises: a housing, an electrolyte disposed in the housing, an anode disposed in the housing, and a stabilized cathode disposed in the housing and comprising a cathode material. The cathode material comprises: a composition selected from birnessite or layered-polymorph of manganese dioxide ($\delta$-$MnO_2$), the composition being stabilized by bismuth and copper ions, a conductive carbon, and a binder. The method further comprises stabilizing the cathode with the bismuth and copper ions during the discharging and charging.

In an embodiment, a battery comprises a housing, an electrolyte disposed in the housing, an anode disposed in the housing, and a stabilized cathode disposed in the housing and comprising a cathode material. The cathode material comprises birnessite comprising bismuth ions and copper ions, a conductive carbon, and a binder. The birnessite is stabilized by bismuth and copper ions, and the anode is at least 50% (m/m) lithium.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Manganese oxide ($MnO_2$)/Li batteries are useful for commercialization because of the high theoretical specific and volumetric energy densities as a result of its high voltage (3-3.5V). This chemistry is also preferred because of its inherent safety. The primary reaction through which the battery is able to store/deliver the energy is through Li ions intercalating in the $MnO_2$. However, the solubility of $MnO_2$ in $LiPF_6$ and the instability of the $MnO_2$ during intercalation effect have a detrimental effect on its utilization as a viable cathode material. Therefore, it can be used as primary batteries with reduced energy densities for use in cameras, memory backup and electronics. The batteries capacity is highly underutilized for energy dense rechargeable/primary applications like electric vehicles, grid-scale storage, etc.

Birnessite is a polymorph of manganese dioxide ($MnO_2$), where its layered structure can be exploited for a number of applications, for example to intercalate lithium (Li) ions in lithium-ion batteries, magnesium (Mg) in magnesium-ion batteries, aluminum in aluminum-ion batteries, etc. $MnO_2$/Li batteries have high specific (>200 Wh/kg) and volumetric (>500 Wh/L) energy densities; unfortunately, they are used as primary batteries due to the degradation of an unstablized $MnO_2$ on Li intercalation. Also, as primary batteries it is unable to obtain its high energy densities due to the immediate degradation of $MnO_2$ crystal structure on intercalation.

As disclosed herein, the use of a birnessite compound whose structure is stabilized by the use of copper and bismuth ions is described. The copper ions also play an additional role in enhancing the charge transfer characteristics of the resistive birnessite compound. This copper and bismuth stabilized birnessite compound is an ideal cathode for a rechargeable Li-ion battery as its structure remains intact on Li-ion intercalation, and also, is an ideal cathode for primary Li-ion batteries as it is able to obtain energy densities close to its theoretical values due to its stabilized structure. This cathode is applicable in Mg-ion, Al-ion and other battery chemistries.

As disclosed herein, a highly stabilized polymorph of MnO2 called birnessite can be used as a cathode is described for use in Li-ion, Mg-ion, Zn-ion and Al-ion batteries. The birnessite has a layered structure which is stabilized by the use of copper and bismuth ions. Copper also has the additional benefit of enhancing the charge transfer characteristics of highly resistive birnessite. The advantage that is realized by using the stabilized birnessite is that the birnessite/Li battery is rechargeable with high energy density or it is a primary battery capable of reaching close to its theoretical energy density values. The stabilized cathode allows for the significant retention of its theoretical capacity against a lithium anode. Similar advantages are applicable to Mg-ion, Al-ion and Zn-ion batteries.

The stability of the layered birnessite is achieved by intercalating its layers with copper and bismuth ions. Intercalation is one of the proposed mechanisms, however, other mechanisms could also be possibilities that help achieve the stability. Another benefit of using copper is that it enhances the charge transfer characteristics of the resistive birnessite compound. Although copper and bismuth are described in this invention other metallic ions can also be used that aid in improving the charge transfer characteristics and stability, for example tin, aluminum, nickel, iron, lead and cobalt. The synthesis of the intercalated birnessite is done through either electrochemical or chemical methods. An advantage that is realized by use of the stabilized birnessite cathode is that the birnessite/Li battery is made rechargeable with high energy density or a primary battery of energy density close to its theoretical values is made possible.

Birnessites are layered polymorphs of manganese dioxides. They can be synthesized through a number of ways, for example electrochemical, chemical, heat treatments of manganese dioxides, etc. The addition of the metallic ions to stabilize the layered structure can be incorporated into the synthesis method directly or could be done separately after synthesizing the birnessites.

Figure 2A:
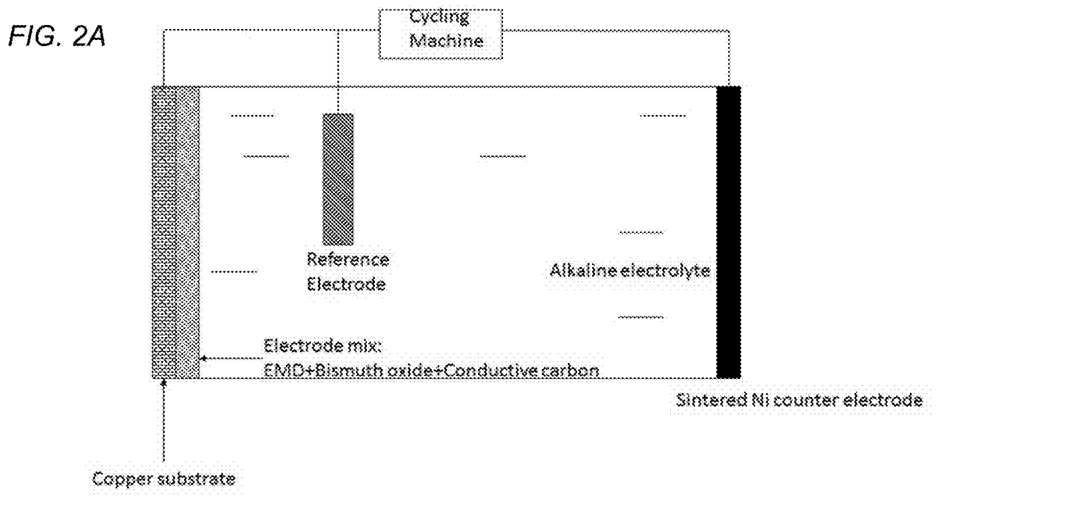
FIG. 2A schematically represents an electrochemical set up for the formation of Cu—Bi-birnessite.

The stabilized cathode material can be synthesized through a number of production routes including an electrochemical process where the layered structure of the birnessite is stabilized by bismuth and copper dopants. For example, a method can include the use of an alkaline electrolyte (sodium hydroxide, potassium hydroxide, lithium hydroxide or a mixture of these), electrolytic manganese dioxide (EMD) or γ-$MnO_2$ as the cathode, and a counter electrode like nickel oxyhydroxide (NiOOH). Other polymorphs of $MnO_2$ can be used as well, but EMD is the cheapest and most easily available material. Other non-interacting counter electrodes can be used as well. The cathodes usually have carbon added in the mix to assist in the electrochemical reactions, as described in more detail herein. The cathode's potential is usually measured against a reference like mercury/mercury oxide (Hg/HgO). The birnessite formation usually takes one-step, wherein the EMD cathode is discharged or reduced vs Hg/HgO to −1V and charged or oxidized vs Hg/HgO to between about 0.3V to 0.4V. An example of the electrode structure and electrochemical setup is shown in FIG. 2A. The reduction and oxidation of the EMD results in a change in the crystal structure of EMD to form the layered birnessite. The reason for the crystal structure alteration is due to the dissolution-precipitation reactions of manganese ions during the reduction and oxidation step.

Figure 2B:
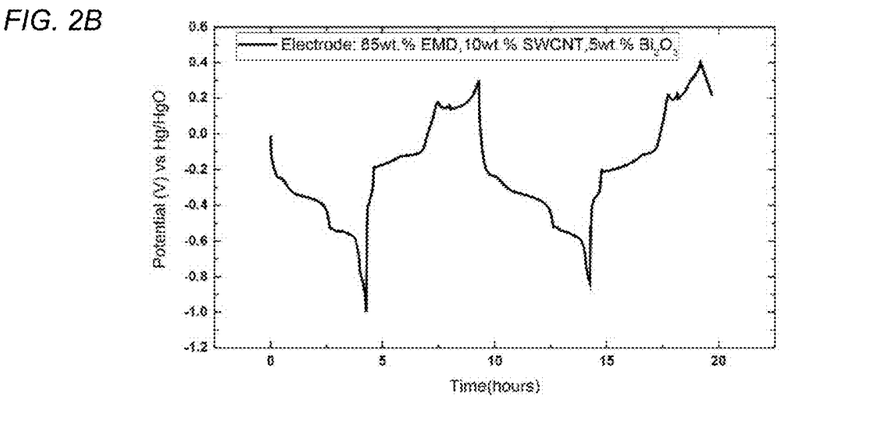
FIG. 2B presents a galvanostatic curve of the performance of a Cu-Bu-birnessite electrode versus a sintered Ni counter electrode.

In an embodiment, a formation procedure can occur as shown in FIG. 2B. As an example, the electrode shown in FIG. 2B comprises of 85 wt. % EMD, 10 wt. % single walled carbon nanotubes (SWCNT) and 5 wt. % bismuth oxide which is pasted on a copper substrate. The formation procedure is shown for 3 cycles at C/5 in 25 wt. % potassium hydroxide solution, however the formation could be for unlimited number of cycles. The formation procedure electrochemically inserts Bi and Cu into the birnessite structure. The electrode can comprise 1-95 wt. % EMD, 0.2-30 wt. % bismuth oxide and 4.8-69 wt. % conductive carbon. An additional nickel and nickel oxide additive can also be added by replacing some of the conductive carbon.

Bismuth and copper ions can be included in the layered structure of the manganese dioxide by use of bismuth bismuth or copper-based salts with the initial EMD mix. Some examples of these are bismuth oxide, copper oxide, copper hydroxide, bismuth hydroxide, bismuth powder and copper powder. Other ways of including the source of bismuth and copper ions could be through the use of the respective metal substrates onto which the mix of EMD and carbon is pasted on. The reduction and oxidation step also brings about the redox reactions of bismuth and copper that eventually enter the crystal structure of the birnessite to stabilize it. The detailed description of the alkaline method does not preclude other electrochemical methods of synthesizing birnessite with copper and bismuth ions incorporated.

When the bismuth is incorporated in the layered structure by use of bismuth salts, the bismuth compound can be incorporated into the cathode as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl) bismuth, dichlordiphenyl(p-tolyl)bismuth, triphenylbismuth.

When the copper is incorporated in the layered structure by use of copper salts, the copper compound can be incorporated into the cathode as an organic or inorganic salt of copper (oxidation states 1, 2, 3 or 4), as a copper oxide, or as copper metal (i.e. elemental copper). The copper compound can be present in a concentration between 1-70 wt %. In some embodiments, the copper compound is present in a concentration between 5-50 wt %. In other embodiments, the copper compound is present in a concentration between 10-50 wt %. In yet other embodiments, the copper compound is present in a concentration between 5-20 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which will not withstand galvanostatic cycling.

A number of chemical methods also exist. An example is the hydrothermal method, where a dissolved solution of potassium permanganate and manganese sulfate in a 6:1 molar ratio is heated in a Teflon container at 160° C. for 12 h. The reactants are the cooled and centrifuged to finally yield birnessite. Copper and bismuth ions can be incorporated directly into the solution by the use of salts as described above (e.g., such as copper sulfate or bismuth sulfide, etc.) or could be incorporated later by mixing the birnessite with the copper and bismuth salts. A number of salts can also be used in the hydrothermal method like nitrates, chlorides, etc. The description of the hydrothermal method does not preclude the use of other chemical methods to synthesize birnessite.

Lithium is used as the anode in the birnessite/Li batteries. The lithium can be a high purity foil and comprise 100 wt. % of the anode. Similarly, magnesium, aluminum and zinc are used as high purity foils and comprise 100 wt. % of the anode in their respective battery chemistries.

The electrolyte can be acidic, alkaline, ionic liquids, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, [M+][AlCl$_4$−](M+)]-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis (hexamethyldisilazide) in tetrahydrofuran etc. and combinations thereof.

The cathode can be pasted on a number of substrates like aluminum, copper, nickel, etc depending on the substrates stability with the choice of electrolyte.

The cathode electrode paste contents are be 1-100 wt. % stabilized birnessite, 0-99 wt. % conductive material and remaining binder.

The conductive material can be TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPERP, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, Zenyatta graphite, nanowires of copper, nickel and silver, carbon nanotubes plated with nickel and combinations thereof.

The binders which may or may not be used can be methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), TEFLON, sodium alginate, styrene-butadiene rubber, polyvinylidene fluoride and combinations thereof.

In some embodiments, the cathode can also comprise a conductive additive. The addition of conductive metal additives to the mixed material cathode may be accomplished by addition of nickel powder to the $MnO_2$+Bi+Cu mixture. The conductive metal additive is present in a concentration of 0-30 wt %. The conductive metal additive may be, for example, nickel, copper, silver, gold, tin, cobalt, antimony, brass, bronze, aluminum, calcium, iron or platinum. In one embodiment, the conductive metal additive is a powder. In one embodiment, a second conductive metal additive is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide [Mn(OH)$_2$] which is non-conductive. This ultimately results in a capacity fade in subsequent cycles. Suitable second additives include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal additives may be incorporated into the electrode by chemical means or by physical means (e.g. ball milling, mortar/pestle, spex mixture). An example of such an electrode comprises 5-95% birnessite, 5-95% conductive carbon, 0-50% second conductive metal additive and 1-10% binder.

The electrode paste are adhered to the metallic support on the working electrode by pressing at, for example, a pressure between 1,000 psi and 20,000 psi (between $6.9 \times 10^6$ and $1.4 \times 10^8$ Pascals). The separator clearly demarcates the cathode from the anode electrode and the bipolar electrode. The separator may be a polymeric separator (e.g. cellophane, sintered polymer film, Celgard).

The conductive carbon can be further protected with a deposit of nickel, copper, tin, aluminum, cobalt, silver or nickel-phosphorous. The deposit may be applied by chemical vapor deposition or physical vapor deposition. Electrochemical methods with a power source or electroless deposition methods can be used as well.

Figure 1:
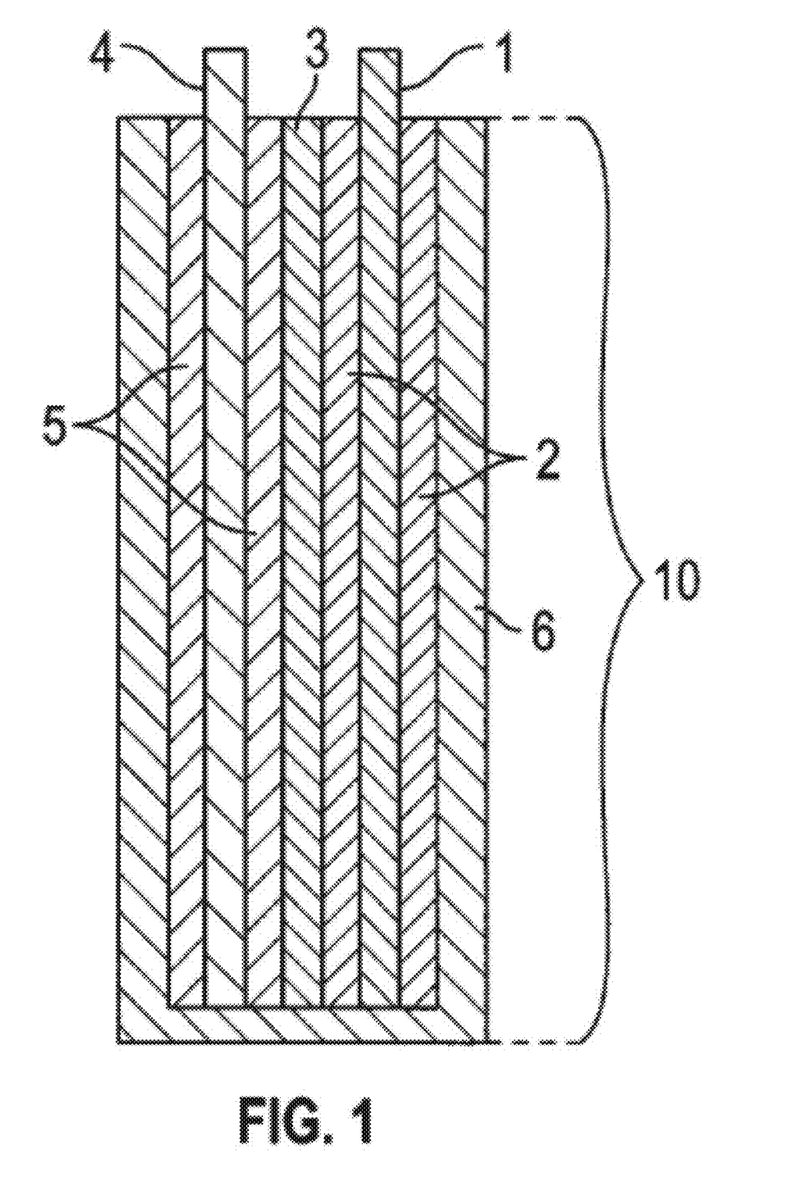
FIG. 1 is a schematic view of a battery according to an embodiment.

In some embodiments, the cathode described herein can be used to form a battery. Referring to FIG. 1 a battery 10 has a housing 6, a cathode current collector 1, a cathode material 2, a separator 3, an anode current collector 4, and an anode material 5. FIG. 1 shows a prismatic battery arrangement. In another embodiment, the battery is a cylindrical battery. The electrolyte can be dispersed in an open space throughout battery 10. Referring to FIG. 2 the cathode current collector 1 and cathode material 2 are collectively called either the cathode 12 or the positive electrode 12.

As described herein, the battery can be operated by being discharged and then recharged to serve as a secondary battery. In some embodiments, the battery can operate as a primary battery and be discharged prior to be discarded. During the charging and discharging cycles, which can occur a plurality of times, the bismuth and copper intercalated birnessite can be used to stabilize the cathode when used with Li-ion, Mg-ion, Zn-ion and Al-ion batteries, thus allowing for repeated cycling without substantial degradation. This allows for a long-life battery to be formed using the materials and battery chemistries as described herein.

In some embodiments, the battery comprising the stabilized Cu—Bi-birnessite cathode can have a capacity of at least 100 mAh/g, or at least 150 mAh/g, at least 200 mAh/g, or at least 250 mAh/g for at least 100 cycles, at least 200 cycles, at least 300 cycles, at least 400 cycles, or at least 500 cycles. In some embodiments, the battery comprising the stabilized Cu—Bi-birnessite cathode can have a capacity of at least 100 mAh/g or at least 150 mAh/g for at least 500 cycles, at least 100 cycles, or at least 1500 cycles. In some embodiments, the battery comprising the stabilized Cu—Bi-birnessite cathode can retain at least about 50%, at least about 60%, or at least about 70% of the initial capacity for at least about 100 cycles, at least 200 cycles, at least 300 cycles, at least 400 cycles, or at least 500 cycles.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

In example 1, an electrode comprising of 10 wt. % EMD, 2 wt. % bismuth oxide and 90 wt. % multiwalled carbon nanotubes plated with Ni was formed against sintered nickel counter electrode for 10 cycles. The powders obtained from this process was washed with deionized water for multiple times and dried. These powders were then mixed with polyvinylidene fluoride (PVDF) binder and n-methyl-2-pyrrolidone (NMP) and casted on aluminum foil. The foil was dried at 120° C. overnight and then cut into discs for Li-ion cell testing. The active mass composition was ~9 wt. %. The cells were tested at 1C and 2C against a Li chip in lithium hexafluorophosphate (ethylene carbonate and dimethyl carbonate were used as electrolyte additives) as the electrolyte.

Figure 3A:
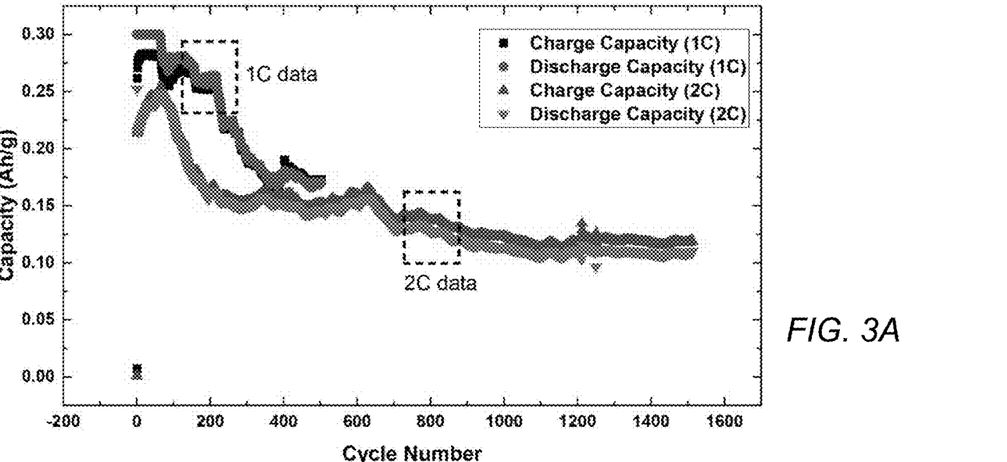
FIG. 3A provides a graph showing the cycle life data for Cu—Bi-Birnessite cathode vs Li operated at 1C and 2C.
Figure 3B:
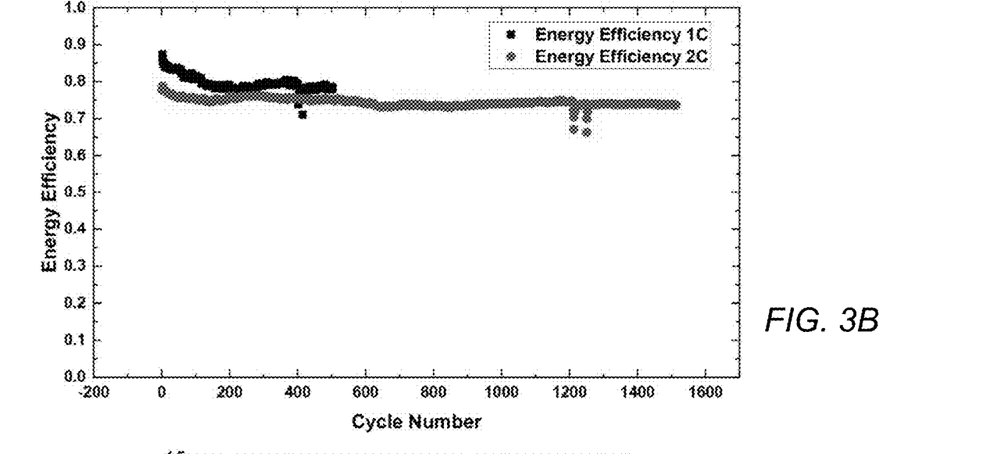
FIG. 3B provides a graph showing energy efficiency data for Cu—Bi-Birnessite cathode vs Li operated at 1C and 2C.
Figure 3C:
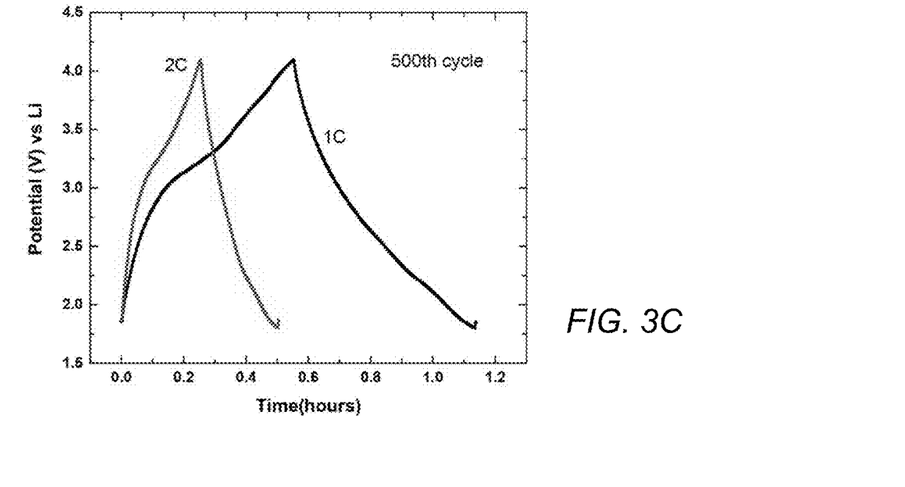
FIG. 3C provides a graph showing a potential-time curve at 500th cycle for 1C and 2C cell.

The cycling data and the potential curves for the 500$^{th}$ cycle are shown in FIGS. 3A-3C. The 1C and 2C cells show significant retention of theoretical capacity (~310 mAh/g). Even after 500 cycles both cells show more than 50% retention of capacity with near 100% energy efficiency. The energy efficiency of the cells are also >75% as shown in FIG. 3B. The 500$^{th}$ cycle potential-time curves are shown for 1C and 2C in FIG. 3C. It seems that at low loadings of active material in the Cu—Bi-birnessite cathode the discharge curves show a sloping behavior, which is typical of amorphous structured materials like the birnessites.

Example 2

Figure 4A:
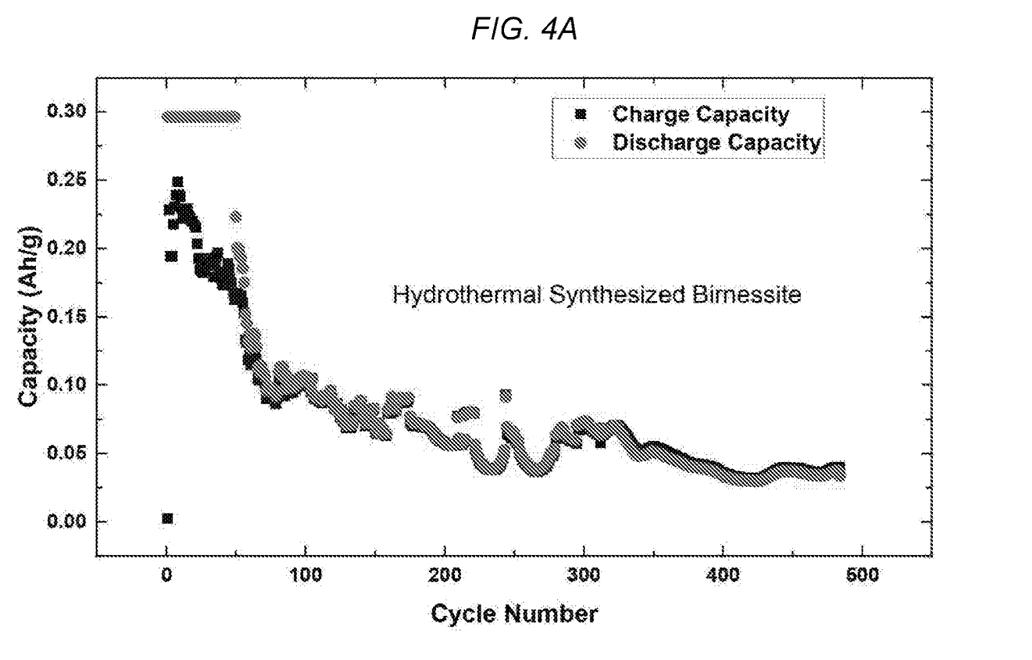
FIG. 4A provides a graph showing cycle life data of the hydrothermal synthesized Bi-Birnessite at 1C.
Figure 4B:
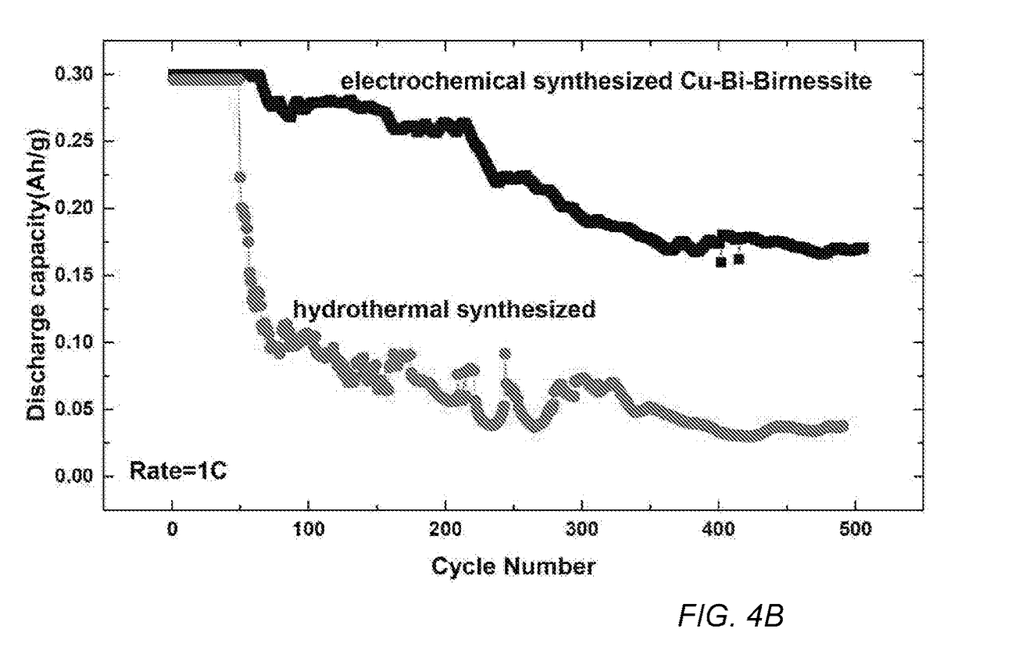
FIG. 4B provides a graph comparing of the 2 different methods of synthesizing birnessites.

In example 2, a hydrothermal synthesized birnessite with bismuth oxide included was cycled against Li. The synthesized birnessite comprised around 18 wt. % of the electrode weight. The cell was cycled at 1C. FIG. 4A shows that the cell was able to deliver ~300 mAh/g for around 70 cycles after which it experienced a precipitous fall. A comparison of the 2 different methods of synthesizing the structure is shown in FIG. 4B, where the electrochemical method of synthesizing the structure is seen as an improvement over the hydrothermal method.

Example 3

In example 3, an electrode comprising of 85 wt. % EMD, 10 wt. % SWCNT and 5 wt. % bismuth oxide was formed for 8 cycles. The powders were washed thoroughly with DI water and dried. 85 wt. % of the formed mix with then mixed with 5 wt. % SWCNT and 10 wt. % PVDF. NMP was used to make a slurry and caste on Al foil. The casted foil was dried at 120° C. and cut into discs for cell operation.

Figure 5A:
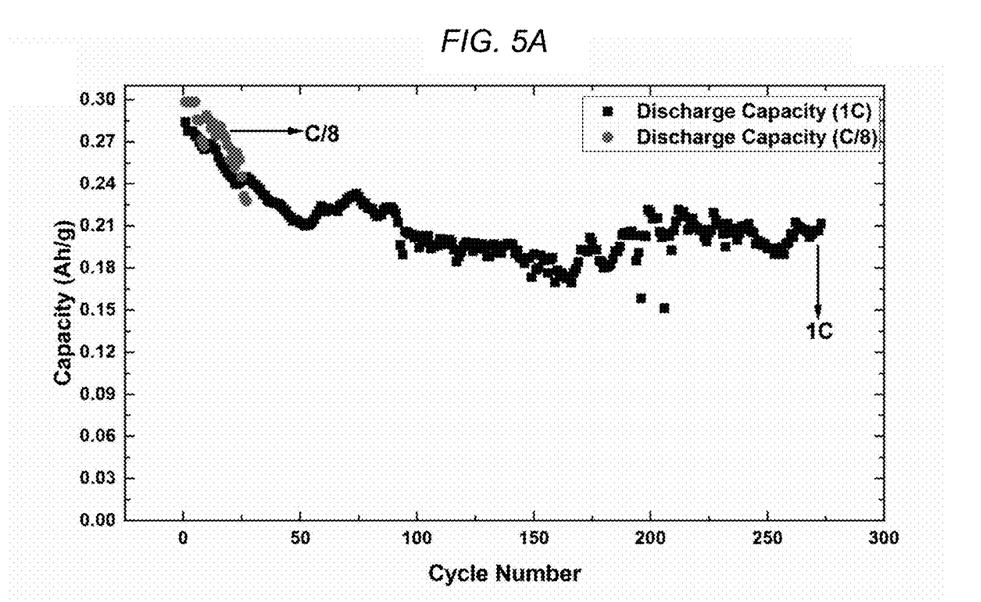
FIG. 5A provides a graph showing cycle life data for the 85 wt. % loading cells cycled at C/8 and 1C.
Figure 5B:
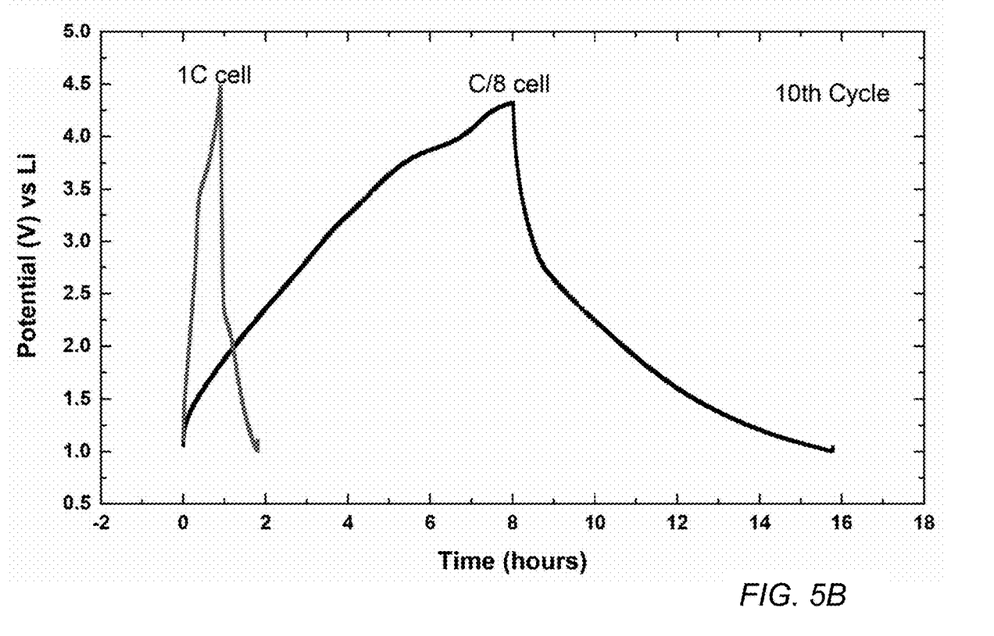
FIG. 5B provides a graph showing a potential-time curve for the 10th cycle.

Two cells were made against Li and cycled at C/8 and 1C, respectively as shown in FIGS. 5A and 5B. The significant retention in capacity with high cycle life for the high loading cells is the best reported in literature as shown in FIG. 5A. FIG. 5B shows the potential time curves for the 10$^{th}$ cycle for the respective cells. Unlike the low loading cells the high loading cells show a clear inflection point during discharge and charge which signify the Li insertion and extraction from the structure Example 4

In example 4, an electrode comprising of 85 wt. % EMD, 10 wt. % SWCNT and 5 wt. % bismuth oxide was formed for 10 cycles. The powders were washed thoroughly with DI water and dried. 85 wt. % of the formed mix with then mixed with 5 wt. % SWCNT and 10 wt. % PVDF. NMP was used to make a slurry and caste on Al foil. The casted foil was dried at 120° C. and cut into discs for cell operation. Also, hydrothermally synthesized birnessite intercalated with Cu was made. 80 wt. % of hydrothermally synthesized Cu-birnessite was mixed with 10 wt. % SWCNT and 10 wt. % PVDF and casted on Al foil with NMP. The casted foil was dried and cut into discs in a similar manner as described before. These two cells were tested and compared against each other as shown in FIGS. 6A and 6B.

Figure 6A:
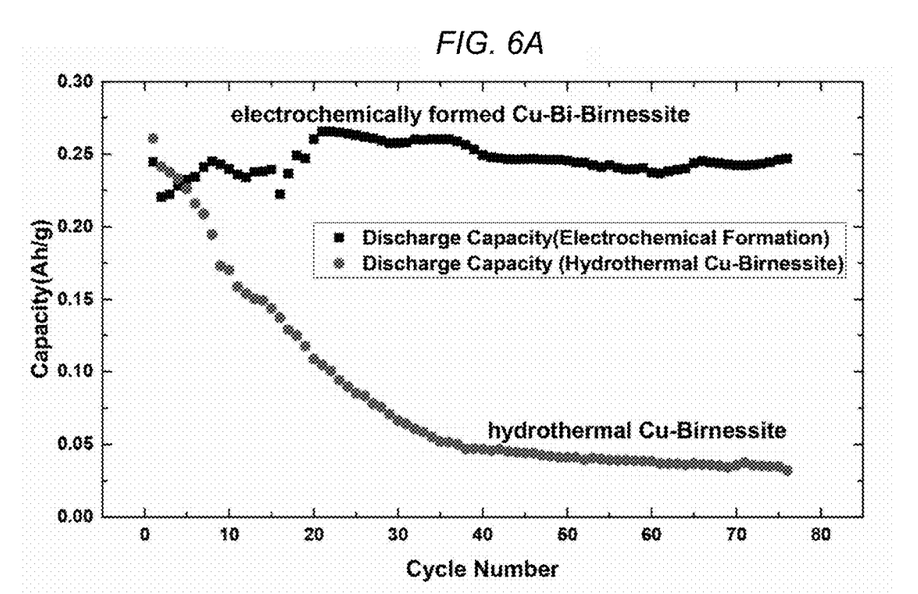
FIG. 6A provides a graph showing Cycle life data comparison between electrochemically and hydrothermally synthesized cathode.
Figure 6B:
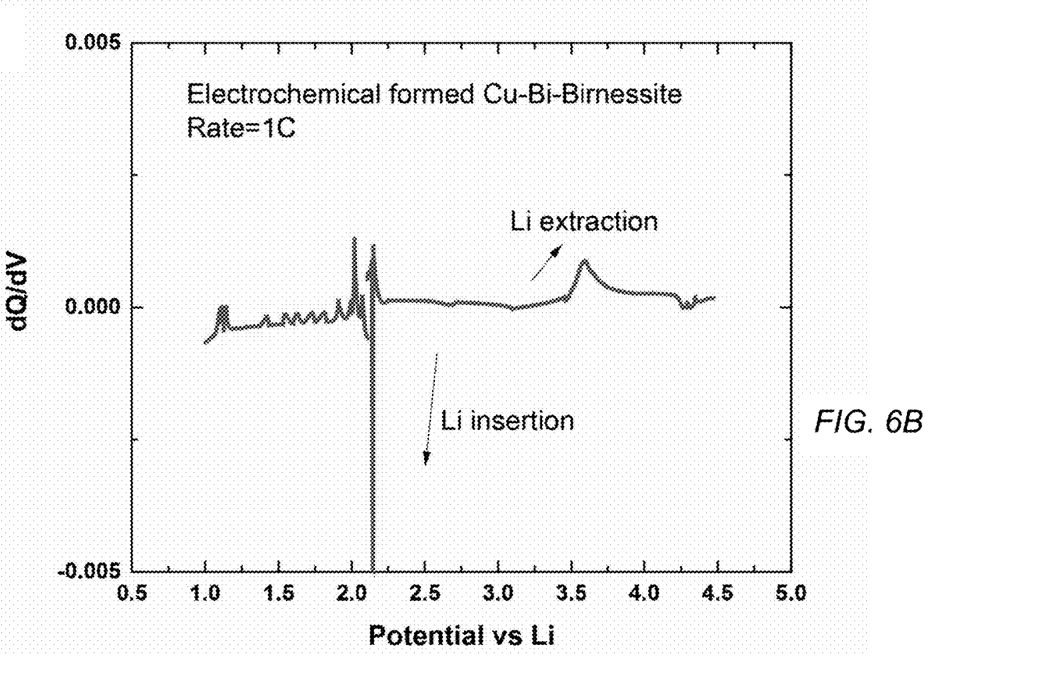
FIG. 6B provides a graph showing dQ/dV curve for the electrochemically formed Cu—Bi-Birnessite cathode.

The electrochemically synthesized Cu—Bi-Birnessite compared to hydrothermal synthesized one showed an improvement in performance as shown in FIG. 6A. The dQ/dV curve in FIG. 6B of the electrochemically synthesized material showed the clear Li insertion and extraction during discharge and charge, respectively.

The best performance for a Li—Mn—O cathode reported was recently published in M. Freire, N. V. Kosova, C. Jordy, D. Chateigner, O. I. Lebedev, A. Maignan and V. Pralong. *Nature Materials,* 2015, 15, 173-177, where the authors showed ~250 mAh/g for 8 cycles. The Cu—Bi-Birnessite cathode described in this patent shows much superior performance for Li intercalation and extraction compared to any Mn—O compound reported in literature.

Having described various devices and methods, certain embodiments can include, but are not limited to:

In a first embodiment, a battery comprises: a housing; an electrolyte disposed in the housing; an anode disposed in the housing; a stabilized cathode disposed in the housing and comprising a cathode material, the cathode material comprising: a composition selected from birnessite or layered-polymorph of manganese dioxide ($\delta$-$MnO_2$), the composition being stabilized by bismuth and copper ions; a conductive carbon; and a binder.

A second embodiment can include the battery of the first embodiment, wherein the anode is at least 50% (m/m) lithium, magnesium, aluminum, or zinc.

A third embodiment can include the battery of the first embodiment, wherein the birnessite is synthesized through electrochemical, chemical, or heat treatment methods.

A fourth embodiment can include the battery of any one of the first to third embodiments, wherein the bismuth and copper ions are included directly after making birnessite.

A fifth embodiment can include the battery of any one of the first to third embodiments, further comprising a metallic ion selected from the group consisting of tin, aluminum, nickel, iron, cobalt and lead.

A sixth embodiment can include the battery of any one of the first to third embodiments, wherein the binder comprises a polytetrafluoroethylene, polyvinylidene fluoride, a cellulose-based hydrogel or a combination thereof.

A seventh embodiment can include the battery of any one of the first to third embodiments, wherein the binder is a cellulose-based hydrogel selected from the group consisting of methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose and hydroxyethyl cellulose (HEC).

An eighth embodiment can include the battery of the seventh embodiment, wherein the binder is a cellulose-based hydrogel crosslinked with a copolymer selected from the group consisting of polyvinyl alcohol, polyvinylacetate, polyaniline, polyvinylpyrrolidone, polyvinylidene fluoride and polypyrrole.

A ninth embodiment can include the battery of any one of the first to third embodiments, wherein the conductive carbon is selected from the group consisting of TIMREX® Primary Synthetic Graphite, TIMREX® Natural Flake Graphite, TIMREX® MB, TIMREX® MK, TIMREX® MX, TIMREX® KC, TIMREX® B, TIMREX® LB, TIMREX® Dispersions; ENASCO 150G, ENASCO 210G, ENASCO 250G, ENASCO 260G, ENASCO 350G, ENASCO 150P, ENASCO 250P; SUPERP, SUPER P Li, carbon black acetylene black, single walled carbon nanotubes, multi-walled carbon nanotubes graphene, graphyne, graphene oxide, Zenyatta graphite and combinations thereof.

A tenth embodiment can include the battery of the ninth embodiment, where in the conductive carbon further comprises a deposit of nickel, copper, tin, aluminum, cobalt, silver or nickel-phosphorous.

An eleventh embodiment can include the battery of any one of the first to third embodiments, where the cathode material is 1-100 wt. % stabilized birnessite, 0-99 wt. % conductive carbon and 0-10 wt. % binder.

A twelfth embodiment can include the battery of any one of the first to third embodiments, wherein the cathode material has a porosity between 5-95%.

A thirteenth embodiment can include the battery of any one of the first to third embodiments, further comprising a current collector for the cathode material, the current collector selected from the group consisting of copper, aluminum and nickel.

A fourteenth embodiment can include the battery of any one of the first to third embodiments, wherein the electrolyte is an acidic electrolyte, ab alkaline electrolyte, an ionic liquid, an organic-based electrolyte, a solid-phase electrolyte, a gelled electrolyte, or combinations thereof.

A fifteenth embodiment can include the battery of any one of the first to third embodiments, wherein the electrolyte is selected from the group consisting of chlorides, sulfates, sodium hydroxide, potassium hydroxide, lithium hydroxide, a perchlorate, lithium perchlorate, magnesium perchlorate, aluminum perchlorate lithium hexafluorophosphate, $[M^+]$ $[AlCl_4^-](M^+)$]-sulphonyl chloride, a phosphoryl chloride cation, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents, 1,2-dimethoxyethane, propylene carbonate, magnesium bis (hexamethyldisilazide) in tetrahydrofuran and combinations thereof.

A sixteenth embodiment can include the battery of any one of the first to third embodiments, further comprising a polymeric or ceramic separator between the anode and the cathode material.

In a seventeenth embodiment, a method of operating a battery comprises: discharging a battery, wherein the battery comprises: a housing; an electrolyte disposed in the housing; an anode disposed in the housing; a stabilized cathode disposed in the housing and comprising a cathode material, the cathode material comprising: a composition selected from birnessite or layered-polymorph of manganese dioxide ($\delta$-$MnO_2$), the composition being stabilized by bismuth and copper ions; a conductive carbon; and a binder; charging the battery; and stabilizing the cathode with the bismuth and copper ions during the discharging and charging.

An eighteenth embodiment can include the method of the seventeenth embodiment, wherein the anode is at least 50% (m/m) lithium, magnesium, aluminum, or zinc.

A nineteenth embodiment can include the method of the seventeenth embodiment, wherein the birnessite is synthesized through electrochemical, chemical, or heat treatment methods.

A twentieth embodiment can include the method of any one of the seventeenth to nineteenth embodiments, wherein the bismuth and copper ions are included directly after making birnessite.

A twenty first embodiment can include the method of any one of the seventeenth to nineteenth embodiments, further comprising a metallic ion selected from the group consisting of tin, aluminum, nickel, iron, cobalt and lead.

A twenty second embodiment can include the method of any one of the seventeenth to nineteenth embodiments, wherein the binder comprises a polytetrafluoroethylene, polyvinylidene fluoride, a cellulose-based hydrogel or a combination thereof.

A twenty third embodiment can include the method of any one of the seventeenth to nineteenth embodiments, wherein the binder is a cellulose-based hydrogel selected from the group consisting of methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose and hydroxyethyl cellulose (HEC).

A twenty fourth embodiment can include the method of the twenty third embodiment, wherein the binder is a cellulose-based hydrogel crosslinked with a copolymer selected from the group consisting of polyvinyl alcohol, polyvinylacetate, polyaniline, polyvinylpyrrolidone, polyvinylidene fluoride and polypyrrole.

A twenty fifth embodiment can include the method of any one of the seventeenth to nineteenth embodiments, wherein the conductive carbon is selected from the group consisting of TIMREX® Primary Synthetic Graphite, TIMREX® Natural Flake Graphite, TIMREX® MB, TIMREX® MK, TIMREX® MX, TIMREX® KC, TIMREX® B, TIMREX® LB, TIMREX® Dispersions; ENASCO 150G, ENASCO 210G, ENASCO 250G, ENASCO 260G, ENASCO 350G, ENASCO 150P, ENASCO 250P; SUPERP, SUPER P Li, carbon black acetylene black, single walled carbon nanotubes, multi-walled carbon nanotubes graphene, graphyne, graphene oxide, Zenyatta graphite and combinations thereof.

A twenty sixth embodiment can include the method of the twenty fifth embodiment, where in the conductive carbon further comprises a deposit of nickel, copper, tin, aluminum, cobalt, silver or nickel-phosphorous.

A twenty seventh embodiment can include the method of any one of the seventeenth to nineteenth embodiments, where the cathode material is 1-100 wt. % stabilized birnessite, 0-99 wt. % conductive carbon and 0-10 wt. % binder.

A twenty eighth embodiment can include the method of any one of the seventeenth to nineteenth embodiments, wherein the cathode material has a porosity between 5-95%.

A twenty ninth embodiment can include the method of any one of the seventeenth to nineteenth embodiments, further comprising a current collector for the cathode material, the current collector selected from the group consisting of copper, aluminum and nickel.

A thirtieth embodiment can include the method of any one of the seventeenth to nineteenth embodiments, wherein the electrolyte is an acidic electrolyte, ab alkaline electrolyte, an ionic liquid, an organic-based electrolyte, a solid-phase electrolyte, a gelled electrolyte, or combinations thereof.

A thirty first embodiment can include the method of any one of the seventeenth to nineteenth embodiments, wherein the electrolyte is selected from the group consisting of chlorides, sulfates, sodium hydroxide, potassium hydroxide, lithium hydroxide, a perchlorate, lithium perchlorate, magnesium perchlorate, aluminum perchlorate lithium hexafluorophosphate, $[M^{30}][AlCl_4^-](M^+)$]-sulphonyl chloride, a phosphoryl chloride cation, 1-ethyl-3-methylimidazolium bis (trifluoromethylsulfonyl)imide, 1-ethyl-3-methylimidazolium trifluoromethanesulfonate, 1-butyl-1-methylpyrrolidinium bis(trifluoromethylsulfonyl)imide, 1-hexyl-3-methylimidazolium hexofluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents, 1,2-dimethoxyethane, propylene carbonate, magnesium bis(hexamethyldisilazide) in tetrahydrofuran and combinations thereof.

A thirty second embodiment can include the method of any one of the seventeenth to nineteenth embodiments, further comprising a polymeric or ceramic separator between the anode and the cathode material.

In a thirty third embodiment, a battery comprises: a housing; an electrolyte disposed in the housing; an anode disposed in the housing, wherein the anode is at least 50% (m/m) lithium; a stabilized cathode disposed in the housing and comprising a cathode material, the cathode material comprising: birnessite comprising bismuth ions and copper ions, wherein the birnessite is stabilized by bismuth and copper ions; a conductive carbon; and a binder.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A battery comprising:
   a housing;
   an electrolyte disposed in the housing;
   an anode disposed in the housing, wherein the anode is at least 50% (m/m) lithium, magnesium, or aluminum;
   a stabilized cathode disposed in the housing and comprising a cathode material, the cathode material comprising:
      a composition selected from birnessite or layered-polymorph of manganese dioxide ($\delta$-$MnO_2$), the composition being stabilized by bismuth and copper ions;
      a conductive carbon; and
      a binder.

2. The battery as recited in claim 1, wherein the birnessite is synthesized through electrochemical, chemical, or heat treatment methods.

3. The battery as recited in claim 1, wherein the stabilized cathode further comprises a metallic ion selected from the group consisting of tin, aluminum, nickel, iron, cobalt and lead.

4. The battery as recited in claim 1, wherein the binder comprises a polytetrafluoroethylene, polyvinylidene fluoride, a cellulose-based hydrogel or a combination thereof.

5. The battery as recited in claim 1, wherein the binder is a cellulose-based hydrogel selected from the group consisting of methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose and hydroxyethyl cellulose (HEC).

6. The battery as recited in claim 5, wherein the binder is a cellulose-based hydrogel crosslinked with a copolymer selected from the group consisting of polyvinyl alcohol, polyvinylacetate, polyaniline, polyvinylpyrrolidone, polyvinylidene fluoride and polypyrrole.

7. The battery as recited in claim 1, wherein the conductive carbon is selected from the group consisting of TIMREX® Primary Synthetic Graphite, TIMREX® Natural Flake Graphite, TIMREX® MB, TIMREX® MK, TIMREX® MX, TIMREX® KC, TIMREX® B, TIMREX® LB, TIMREX® Dispersions; ENASCO 150G, ENASCO 210G, ENASCO 250G, ENASCO 260G, ENASCO 350G, ENASCO 150P, ENASCO 250P; SUPER P, SUPER P Li, carbon black, acetylene black, single walled carbon nanotubes, multi-walled carbon nanotubes, graphene, graphyne, graphene oxide, Zenyatta graphite and combinations thereof.

8. The battery as recited in claim 7, wherein the conductive carbon further comprises a deposit of nickel, copper, tin, aluminum, cobalt, silver or nickel-phosphorous.

9. The battery as recited in claim 1, where the cathode material is 1-98 wt. % stabilized birnessite, 1-98 wt. % conductive carbon and 1-10 wt. % binder.

10. The battery as recited in claim 1, wherein the cathode material has a porosity between 5-95%.

11. The battery as recited in claim 1, further comprising a current collector for the cathode material, the current collector selected from the group consisting of copper, aluminum, and nickel.

12. The battery as recited in claim 1, wherein the electrolyte is an acidic electrolyte, an alkaline electrolyte, an ionic liquid, an organic-based electrolyte, a solid-phase electrolyte, a gelled electrolyte, or combinations thereof.

13. The battery as recited in claim 1, wherein the electrolyte is selected from the group consisting of chlorides, sulfates, sodium hydroxide, potassium hydroxide, lithium hydroxide, a perchlorate, lithium perchlorate, magnesium perchlorate, aluminum perchlorate, lithium hexafluorophosphate, $[M^+][AlCl_4^-](M^+)]$-sulphonyl chloride, a phosphoryl chloride cation, 1-ethyl-3-methylimidazolium bis (trifluoromethyl sulfonyl)imide, 1-ethyl-3-methylimidazolium trifluoromethanesulfonate, 1-butyl-1-methylpyrrolidinium bis (trifluoromethyl sulfonyl)imide, 1-hexyl-3-methylimidazolium hexafluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents, 1,2-dimethoxyethane, propylene carbonate, magnesium bis(hexamethyldisilazide) in tetrahydrofuran and combinations thereof.

14. The battery as recited in claim 1, further comprising a polymeric or ceramic separator between the anode and the cathode material.

15. A method of operating a battery comprising:
discharging a battery, wherein the battery comprises:
a housing;
an electrolyte disposed in the housing;
an anode disposed in the housing, wherein the anode is at least 50% (m/m) lithium, magnesium, or aluminum;
a stabilized cathode disposed in the housing and comprising a cathode material, the cathode material comprising:
a composition selected from birnessite or layered-polymorph of manganese dioxide ($\delta$-$MnO_2$), the composition being stabilized by bismuth and copper ions;
a conductive carbon; and
a binder;
charging the battery; and
stabilizing the cathode with the bismuth and copper ions during the discharging and charging.

16. The method as recited in claim 15, wherein the birnessite is synthesized through electrochemical, chemical, or heat treatment methods.

17. The method as recited in claim 15, wherein the bismuth and copper ions are included directly after making birnessite.

18. The method as recited in claim 15, wherein the stabilized cathode further comprises a metallic ion selected from the group consisting of tin, aluminum, nickel, iron, cobalt and lead.

19. The method as recited in claim 15, wherein the binder comprises a polytetrafluoroethylene, polyvinylidene fluoride, a cellulose-based hydrogel or a combination thereof.

20. The method as recited in claim 15, wherein the binder is a cellulose-based hydrogel selected from the group consisting of methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose and hydroxyethyl cellulose (HEC).

21. The method as recited in claim 20, wherein the binder is a cellulose-based hydrogel crosslinked with a copolymer selected from the group consisting of polyvinyl alcohol, polyvinylacetate, polyaniline, polyvinylpyrrolidone, polyvinylidene fluoride and polypyrrole.

22. The method as recited in claim 15, wherein the conductive carbon is selected from the group consisting of TIMREX® Primary Synthetic Graphite, TIMREX® Natural Flake Graphite, TIMREX® MB, TIMREX® MK, TIMREX® MX, TIMREX® KC, TIMREX® B, TIMREX® LB, TIMREX® Dispersions; ENASCO 150G, ENASCO 210G, ENASCO 250G, ENASCO 260G, ENASCO 350G, ENASCO 150P, ENASCO 250P; SUPER P, SUPER P Li, carbon black, acetylene black, single walled carbon nanotubes, multi-walled carbon nanotubes, graphene, graphyne, graphene oxide, Zenyatta graphite and combinations thereof.

23. The method as recited in claim 22, where in the conductive carbon further comprises a deposit of nickel, copper, tin, aluminum, cobalt, silver or nickel-phosphorous.

24. The method as recited in claim 15, where the cathode material is 1-98 wt. % stabilized birnessite, 1-98 wt. % conductive carbon and 1-10 wt. % binder.

25. The method as recited in claim 15, wherein the cathode material has a porosity between 5-95%.

26. The method as recited in claim 15, further comprising a current collector for the cathode material, the current collector selected from the group consisting of copper, aluminum and nickel.

27. The method as recited in claim 15, wherein the electrolyte is an acidic electrolyte, an alkaline electrolyte, an ionic liquid, an organic-based electrolyte, a solid-phase electrolyte, a gelled electrolyte, or combinations thereof.

28. The method as recited in claim 15, wherein the electrolyte is selected from the group consisting of chlorides, sulfates, sodium hydroxide, potassium hydroxide, lithium hydroxide, a perchlorate, lithium perchlorate, magnesium perchlorate, aluminum perchlorate, lithium hexafluorophosphate, $[M^+][AlCl_4^-](M^+)]$-sulphonyl chloride, a phosphoryl chloride cation, 1-ethyl-3-methylimidazolium bis (trifluoromethyl sulfonyl)imide, 1-ethyl-3-methylimidazolium trifluoromethanesulfonate, 1-butyl-1-methylpyrrolidinium bis(trifluoromethyl sulfonyl)imide, 1-hexyl-3-methylimidazolium hexafluorophosphate, 1-ethyl-3-methylimidazolium dicyanamide, 11-methyl-3-octylimidazolium tetrafluoroborate, yttria-stabilized zirconia, beta-alumina solid, polyacrylamides, NASICON, lithium salts in mixed organic solvents, 1,2-dimethoxyethane, propylene carbonate, magnesium bis(hexamethyldisilazide) in tetrahydrofuran and combinations thereof.

29. The method as recited in claim 15, further comprising a polymeric or ceramic separator between the anode and the cathode material.

30. The method as recited in claim 15, further comprising:
   discharging and charging the battery at least 100 times, and
   retaining a capacity of at least 150 mAh/g while discharging the batter after the discharging and charging at least the 100 times.

31. A battery comprising:
   a housing;
   an electrolyte disposed in the housing;
   an anode disposed in the housing, wherein the anode is at least 50% (m/m) lithium;
   a stabilized cathode disposed in the housing and comprising a cathode material, the cathode material comprising:
      birnessite comprising bismuth ions and copper ions, wherein the birnessite is stabilized by bismuth and copper ions;
      a conductive carbon; and
      a binder.

* * * * *